(12) United States Patent
Yokoyama et al.

(10) Patent No.: US 11,321,789 B2
(45) Date of Patent: May 3, 2022

(54) V2G SYSTEM, SERVER APPARATUS, AND TRANSPORT MACHINE

(71) Applicant: HONDA MOTOR CO., LTD., Tokyo (JP)

(72) Inventors: Shinichi Yokoyama, Saitama (JP); Hakaru Sadano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 673 days.

(21) Appl. No.: 15/882,121

(22) Filed: Jan. 29, 2018

(65) Prior Publication Data
US 2018/0218459 A1 Aug. 2, 2018

(30) Foreign Application Priority Data

Jan. 30, 2017 (JP) .............................. JP2017-014679

(51) Int. Cl.
*G06Q 50/06* (2012.01)
*G06Q 40/04* (2012.01)
(Continued)

(52) U.S. Cl.
CPC ....... *G06Q 50/06* (2013.01); *G06Q 10/06315* (2013.01); *G06Q 40/04* (2013.01); *H04L 67/12* (2013.01); *Y04S 10/50* (2013.01)

(58) Field of Classification Search
None
See application file for complete search history.

(56) References Cited

U.S. PATENT DOCUMENTS

| 8,935,112 B2 | 1/2015 | Lowenthal et al. |
| 2011/0057612 A1 | 3/2011 | Taguchi et al. |

(Continued)

FOREIGN PATENT DOCUMENTS

| CN | 103034776 A | 4/2013 |
| CN | 103595087 A | 2/2014 |

(Continued)

OTHER PUBLICATIONS

J. Yu, W. Gu and Z. Wu, "Intelligent PHEV charging and discharging strategy in smart grid," 2012 IEEE Fifth International Conference on Advanced Computational Intelligence (ICACI), 2012, pp. 1107-1112, doi: 10.1109/ICACI.2012.6463345. (Year: 2012 ).*

(Continued)

*Primary Examiner* — Mehmet Yesildag
(74) *Attorney, Agent, or Firm* — Paratus Law Group, PLLC (57) ABSTRACT

There is provided a V2G system including a parent aggregator which manages buying and selling of power from a plurality of power supply sources to a power grid, and a child aggregator which manages a plurality of transport machines and guarantees the parent aggregator charging and discharging between at least one of batteries mounted on the transport machines and the power grid. The child aggregator acquires first information regarding the charging and discharging and second information regarding the transport machines from each of the transport machines, aggregates the first information and the second information, and transmits at least the first information to the parent aggregator.

4 Claims, 5 Drawing Sheets

(51) Int. Cl.
*G06Q 10/06* (2012.01)
*H04L 67/12* (2022.01)

(56) References Cited

U.S. PATENT DOCUMENTS

| | | |
|---|---|---|
| 2011/0202418 A1 | 8/2011 | Kempton et al. |
| 2011/0204720 A1* | 8/2011 | Ruiz ................. B60L 53/57 307/66 |
| 2012/0249068 A1* | 10/2012 | Ishida ............... B60L 53/665 320/109 |
| 2013/0054045 A1 | 2/2013 | Ramezani et al. |
| 2014/0049216 A1 | 2/2014 | Nakagawa et al. |
| 2014/0143002 A1* | 5/2014 | Aisu ................. B60L 53/67 705/7.18 |
| 2014/0379154 A1 | 12/2014 | Watanabe et al. |
| 2015/0380936 A1* | 12/2015 | Frolik ............... H02J 3/14 307/112 |
| 2016/0009192 A1* | 1/2016 | Zhang ............... B60L 53/665 320/109 |
| 2016/0140449 A1* | 5/2016 | Ansari ............... G06N 7/02 706/52 |
| 2016/0159239 A1* | 6/2016 | Shi .................... H02J 3/32 320/134 |
| 2016/0275294 A1 | 9/2016 | Irvine |
| 2018/0186246 A1 | 7/2018 | Kudo et al. |
| 2019/0036895 A1 | 1/2019 | Irvine |
| 2019/0061552 A1* | 2/2019 | Amari ............... H02J 13/0006 |

FOREIGN PATENT DOCUMENTS

| | | | |
|---|---|---|---|
| CN | 104753164 A | 7/2015 | |
| CN | 105989295 A | 10/2016 | |
| JP | 2013-045376 A | 3/2013 | |
| JP | 5476872 B2 | 4/2014 | |
| JP | 2016-007135 A | 1/2016 | |
| WO | WO-2015041171 A1 * | 3/2015 | ............ B60L 53/305 |
| WO | WO 2017/009978 A1 | 1/2017 | |

OTHER PUBLICATIONS

Y. Zhou and X. Li, "Vehicle to grid technology: A review," 2015 34th Chinese Control Conference (CCC), 2015, pp. 9031-9036, doi: 10.1109/ChiCC.2015.7261068. (Year: 2015).*

Oct. 16, 2018, Japanese Office Action issued for related JP Application No. 2017-014679.

Mar. 3, 2021, Chinese Office Action issued for related CN application No. 201810071159.0, considered english options only.

Yan Wenxiao, Research on User Privacy Preserving in Vehicle to Grid Network, North China Electric Power University Thesis for the Master Degree, Jun. 2015, pp. 1-51.

Jie Chen et al., An Anonymous Authentication Scheme for Plugin Electric Vehicles Joining to Charging/Discharging Station in Vehicle-to-Grid (V2G) Networks, China Communications, Mar. 2015, pp. 9-19.

Sep. 27, 2021, Chinese Office Action issued for related CN application No. 201810071159.0.

* cited by examiner

V2G SYSTEM, SERVER APPARATUS, AND TRANSPORT MACHINE

CROSS-REFERENCE TO RELATED APPLICATIONS

The present application claims the benefit of priority of Japanese Patent Application No. 2017-014679, filed on Jan. 30, 2017, the content of which is incorporated herein by reference.

TECHNICAL FIELD

The present invention relates to a Vehicle-to-Grid (V2G) system, a server apparatus, and a transport machine in V2G which is capable of bidirectional power transfer between a battery provided in the transport machine and a power system.

BACKGROUND ART

In V2G which is capable of bidirectional power transfer between a power system including a power grid and vehicles such as Electric Vehicle (EV), a server called an aggregator which makes central management on charging and discharging of batteries provided in the vehicles plays an important role. The aggregator is connected to the vehicles through a communication network and instructs the vehicles to perform charging and discharging with the power grid based on information regarding the vehicles and a power supply-demand state of the power system. US2011/0202418A discloses an aggregator which notifies a power system of a total power capable of being discharged by plural vehicles connected to the aggregator to perform V2G. U.S. Pat. No. 8,935,112B and JP5476872B also disclose a system of managing electric vehicles.

The information transmitted from the vehicles to the aggregator in V2G includes personal information regarding owners of the vehicles in order to provide an incentive (benefit for owners) to owners of vehicles which perform charging and discharging. Therefore, the aggregator holds personal information regarding owners of vehicles participating in V2G. However, if the security level of the aggregator is not sufficient, it is possible that the personal information leaks from the aggregator. If the personal information held in the aggregator leaks and the number of vehicles participating in V2G is large, the damage thereof is enormous.

SUMMARY

Accordingly, an aspect of the present invention provides a V2G system, a server apparatus, and a transport machine which prevent information from leaking to the outside.

(1) According to an embodiment of the present invention, there is provided a Vehicle-to-Grid (V2G) system including:

a parent aggregator (for example, a parent aggregator 113 in an embodiment described below) which is configured to manage buying and selling of power from a plurality of power supply sources to a power grid (for example, a power grid 101 in the embodiment); and a child aggregator (for example, a child aggregator 111 in the embodiment) which is configured to manage a plurality of transport machines (for example, electrically driven vehicles 107 in the embodiment) and guarantee the parent aggregator charging and discharging between at least one of batteries mounted on the transport machines and the power grid, wherein the child aggregator is configured to:

acquire first information regarding the charging and discharging and second information regarding each of the transport machines from each of the transport machines and aggregates the first information and the second information, and transmit at least the first information to the parent aggregator.

(2) In the above V2G system, the child aggregator may be configured not to transmit the second information to the parent aggregator.

(3) In the above V2G system, the child aggregator may be configured to guarantee a guaranteed amount of power which is the amount of guarantee of power chargeable and dischargeable with the power grid based on an aggregation result of the first information, for the parent aggregator, under reliability of a name of the child aggregator.

(4) In the above V2G system, the child aggregator may be configured to:

manage a stationary power storage facility connected to the power grid, and when an amount of power capable of being charged and discharged between the transport machines and the power grid does not reach the guaranteed amount of power, cause the stationary power storage facility to output power which is a difference between the guaranteed amount of power and the amount of power capable of being charged and discharged.

(5) In the above V2G system, the child aggregator may be configured to:

when a power supply-demand state of a power system including the power grid is stable, manage at least one of the transport machines to discharge power to the stationary power storage facility, and provide an incentive to the transport machines according to a record of the discharge.

(6) In the above V2G system, the child aggregator may be configured to:

receive an incentive from the parent aggregator based on a record of an amount of power which is charged and discharged from and to the power grid, and distribute at least a part of the incentive received from the parent aggregator to a transport machine which performs the charging and discharging based on the record, the first information, and the second information.

(7) In the above V2G system, the child aggregator may be configured to manage a cumulative time during which each of the transport machines performs charging and discharging with the power grid based on a record of an amount of power which is charged and discharged from and to the power grid, the first information, and the second information.

(8) In the above V2G system, the child aggregator may be configured to prohibit the cumulative time managed by the child aggregator from being modified from the transport machines.

(9) According to another embodiment of the present invention, there is provided a server apparatus which is a child aggregator (for example, a child aggregator 111 in the embodiment) configured to manage a plurality of transport machines (for example, electrically driven vehicles 107 in the embodiment) and guarantee charging and discharging between at least one of batteries mounted on the transport machines and a power grid (for example, a power grid 101 in the embodiment), for a parent aggregator (for example, a parent aggregator 113 in the embodiment) configured to manage buying and selling of power from a plurality of power supply sources to the power grid, the server apparatus being configured to:

acquire first information regarding the charging and discharging and second information regarding the transport machines from each of the transport machines and aggregate the first information and the second information; and transmit at least the first information to the parent aggregator.

(10) According to a further embodiment of the present invention, there is provided a transport machine (for example, an electrically driven vehicle 107 in the embodiment) which is capable of performing charging and discharging with a power grid (for example, a power grid 101 in the embodiment), wherein the transport machine is managed by a child aggregator (for example, a child aggregator 111 in the embodiment) configured to guarantee charging and discharging between a battery mounted on the transport machine and the power grid, for a parent aggregator (for example, a parent aggregator 113 in the embodiment) configured to manage buying and selling of power from a plurality of power supply sources to the power grid, wherein the child aggregator is configured to acquire first information regarding the charging and discharging and second information regarding each of transport machines from each of the transport machines and aggregate the first information and the second information, and wherein the child aggregator is configured to transmit at least the first information to the parent aggregator.

ADVANTAGES

When the parent aggregator manages buying and selling of power to the power grid, the child aggregator is considered as one power supply source. In this case, the parent aggregator does not require information regarding the transport machines managed by the child aggregator. In the V2G system according to (1), the server apparatus according to (9), and the transport machine according to (10), among the information obtained from the transport machines managed by the child aggregator, the child aggregator transmits only the first information regarding the charging and discharging to the parent aggregator. Therefore, the second information regarding each of the transport machines is less likely to be transmitted to the parent aggregator. Accordingly, the transmission and holding of the second information, which is desired to be prevented from leaking to the outside, is minimized, that is, the second information is held only in the child aggregator. As a result, a system having high information safety can be realized.

In the V2G system according to (2), the child aggregator does not transmit the second information regarding each of the transport machines to the parent aggregator. As a result, a system having higher information safety can be realized.

In the power selling market, the power selling price is determined depending on the reliability of a seller in many cases. In the V2G system according to (3), the reliability of the legal entity of the child aggregator, which manages the plural transport machines and guarantees the guaranteed amount of power, can be used. Therefore, the contract probability of V2G can increase and the power selling price can increase as compared to a case where the owners of the transport machines individually make a contract with the parent aggregator.

In the V2G system according to (4), the stationary power storage facility can be used as a buffer during charging and discharging. Therefore, the reliability of the child aggregator as a legal entity can be improved. As a result, the contract probability of V2G can farther increase, and the power selling price can further increase.

In the V2G system according to (5), in a case where the power system is stable and there is no charging and discharging instruction from the child aggregator 111 to the transport machine, one of the transport machines discharges power to the stationary power storage facility, and the incentive is provided to the transport machine. Therefore, the stationary power storage facility can maintain a power storage state in which it is capable of being charged and discharged, and can provide the incentive to the transport machine that discharges power to the stationary power storage facility.

In the V2G system according to (6), the child aggregator distributes at least a part of the incentive received from the parent aggregator to the transport machines performing charging and discharging based on the record of the amount of power which is charged and discharged. Accordingly, even in a case where the second information regarding each of the transport machines is not transmitted to the parent aggregator, the child aggregator can provide the incentive to the transport machines managed by the child aggregator.

In the V2G system according to (7), the child aggregator manages the cumulative time during which each of the transport machines performs charging and discharging. Therefore, the cumulative time can be managed with high accuracy, and information regarding the cumulative time can be utilized in various situations managed by the child aggregator.

In the V2G system according to (8), the child aggregator prohibits the cumulative time managed by the child aggregator from being modified from the transport machine. Therefore, the reliability of the cumulative time can be improved.

DETAILED DESCRIPTION OF EMBODIMENT

Hereinafter, an embodiment of the present invention will be described with reference to the drawings.

In a Vehicle-to-grid (V2G) system, power is transferred between a power system including a commercial power grid and an electrically driven vehicle. When an electrically driven vehicle is not used as means for transportation, a battery mounted on the electrically driven vehicle is used as a power storage facility. Bidirectional power transfer is performed between the electrically driven vehicle participating in V2G and the power system.

In the electrically driven vehicle participating in V2G, depending on a state of the power system, continuous discharging for maintaining a supply-demand balance, or charging and discharging for stabilizing the frequency of the power system is performed. Power which is obtained by continuous discharging or continuous charging of the electrically driven vehicle for maintaining a supply-demand balance is used as "Spinning Reserve" of the power system. Continuous discharging for spinning reserve is performed particularly for the supply of power to the power system which is required for maintaining a supply-demand balance along with an increase in power demand of the power system. In addition, continuous charging for spinning reserve is performed particularly for the reception of power from a power system which is required for maintaining a supply-demand balance along with an increase in power supply of the power system. On the other hand, power which is transferred by charging and discharging of the electrically driven vehicle for stabilizing the frequency is used for "Frequency Regulation" of the power system. In either case, the electrically driven vehicle contributes to the stabilization of the power system. In the following description, both of the supply and reception of power for spinning reserve between the electrically driven vehicle and the power system and the supply and reception of power for frequency regulation between the electrically driven vehicle and the power system will be collectively referred to as "charging and discharging" between the electrically driven vehicle and the power system.

Figure 1:
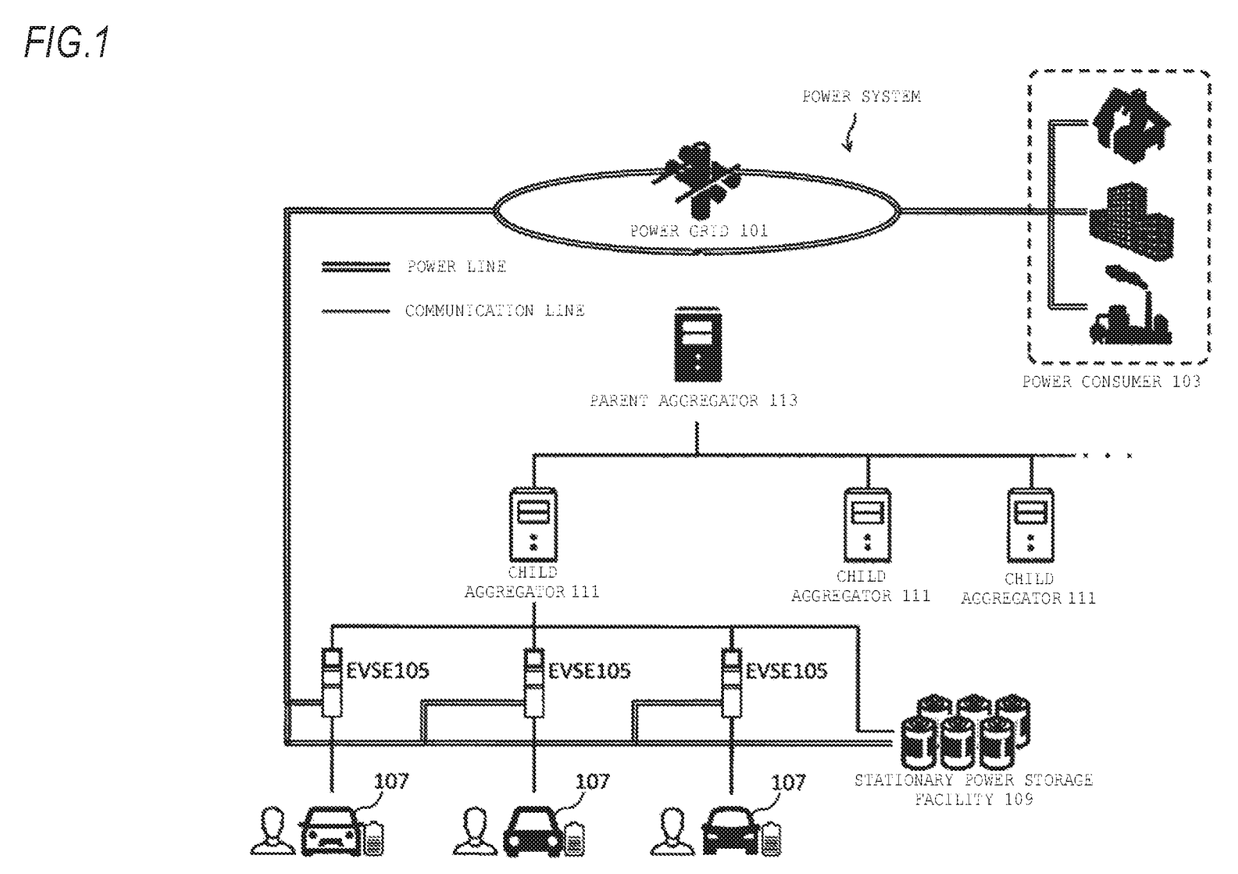
FIG. 1 is a diagram illustrating an overall configuration of a V2G system.

FIG. 1 is a diagram illustrating an overall configuration of a V2G system. As illustrated in FIG. 1, the V2G system includes: a power grid 101 which transmits power generated from a power plant by energy such as thermal power, wind power, nuclear power, or solar photovoltaic power; a power system including a power consumer 103 which requires electricity and receives supply of power; an Electric Vehicle Service Equipment (EVSE) 105 as an external power supply device which is connected to the power grid 101 through a power distribution equipment and the like (not illustrated); electrically driven vehicles 107 such as Electric Vehicle (EV) or Plug-in Hybrid Electric Vehicle (PHEV) on which a rechargeable battery is mounted; a stationary power storage facility 109 in which plural rechargeable batteries are provided; a child aggregator 111 which manages charging and discharging of the batteries and the like in the electrically driven vehicles 107 through the EVSE 105 and manages discharging of the stationary power storage facility 109; and a parent aggregator 113 which manages buying and selling of power from a power supply source managed by the child aggregator 111 to the power grid 101 in response to a request from a power company operated by a power plant or from a power transmission company operated by the power grid 101. The child aggregator 111 may include a processor and memory storing instructions, when executed by the processor, perform respective operations of the child aggregator 111. The parent aggregator 113 may include a processor and memory storing instructions, when executed by the processor, perform respective operations of the child aggregator 113.

The EVSE 105 and the child aggregator 111 are connected through a wired or wireless communication network. Therefore, information regarding charging and discharging and information regarding the electrically driven vehicle 107 can be transferred between the electrically driven vehicle 107 and the child aggregator 111 which are connected to the EVSE 105. In addition, the child aggregator 111 and the parent aggregator 113 are connected through the communication network. Therefore, information regarding charging and discharging can be transferred between the child aggregator 111 and the parent aggregator 113.

Hereinafter, the child aggregator 111 will be described in detail with reference to FIGS. 2 to 5. The child aggregator 111 manages charging and discharging of batteries of plural electrically driven vehicles through plural EVSEs 105 connected to the electrically driven vehicles, respectively and guarantees the parent aggregator 113 charging and discharging between the batteries and the power grid 101. In examples illustrated in FIGS. 2 to 5, the child aggregator 111 manages three electrically driven vehicles 107 connected to three EVSEs 105, respectively and manages one stationary power storage facility 109 connected to the power grid 101.

Figure 2:
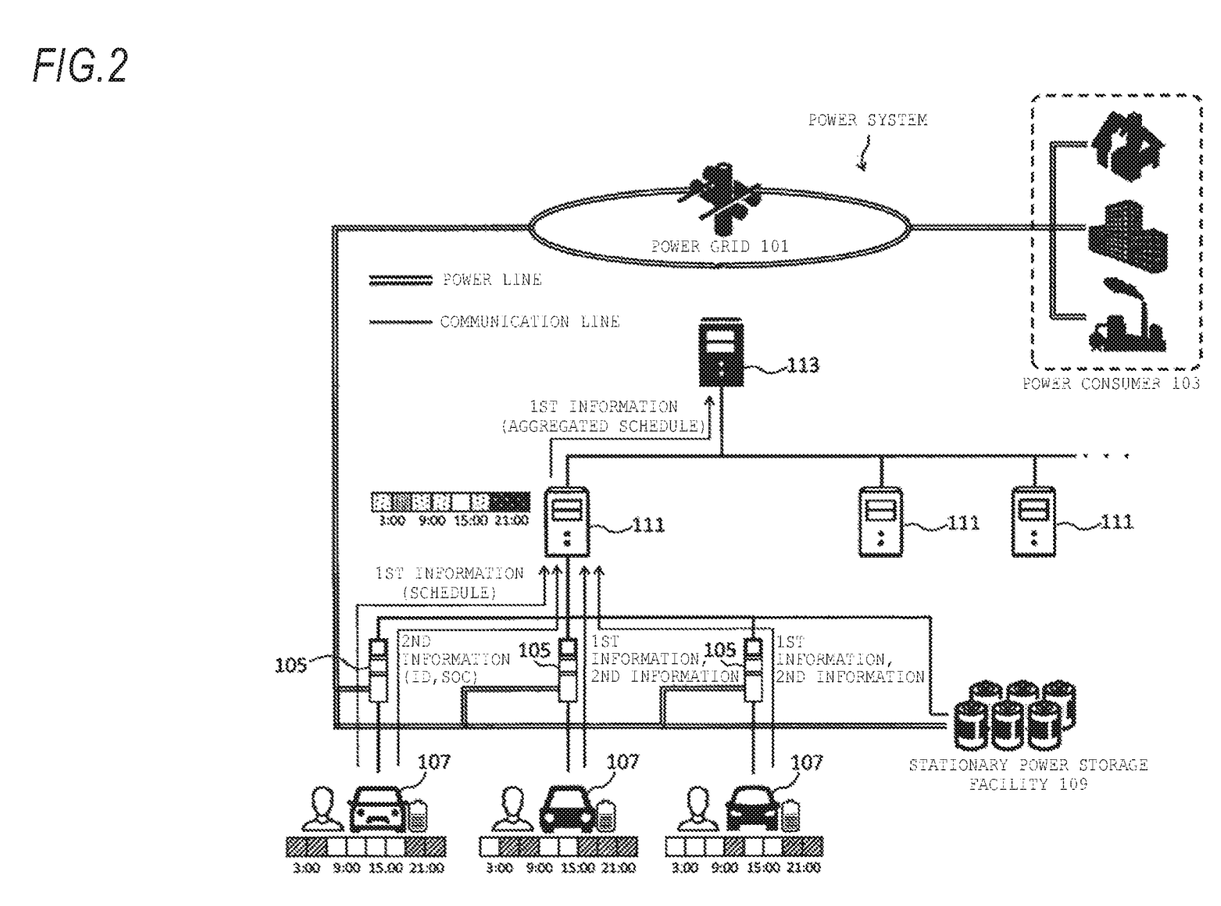
FIG. 2 is a diagram illustrating a relationship between information which is acquired from respective electrically driven vehicles by a child aggregator and information which is transmitted to a parent aggregator by the child aggregator.

FIG. 2 is a diagram illustrating a relationship between information which is acquired from the respective electrically driven vehicles 107 by the child aggregator 111 and information which is transmitted to the parent aggregator 113 by the child aggregator 111. As illustrated in FIG. 2, the child aggregator 111 acquires first information and second information from the electrically driven vehicles 107 through the EVSEs 105, respectively. The first information includes a time schedule (hereinafter, simply referred to as "schedule") in which power is capable of being charged and discharged between the respective electrically driven vehicles 107 and the power grid 101. The second information includes personal information regarding the electrically driven vehicles 107 or owners thereof, information regarding State of Charge (SOC) of the batteries mounted on the electrically driven vehicles 107, information regarding State of Health (SOH) of the electrically driven vehicles 107, and information regarding records of the electrically driven vehicles 107 performing charging and discharging. The child aggregator 111 aggregates the first information and the second information acquired from the electrically driven vehicles 107 and transmits a schedule (first information) which is obtained by aggregating schedules of the respective electrically driven vehicles 107, to the parent aggregator 113. The child aggregator 111 does not transmit the second information acquired from the electrically driven vehicles 107 to the parent aggregator 113.

The information to be transmitted from the child aggregator 111 to the parent aggregator 113 is the schedule in which a guaranteed amount of power capable of being charged and discharged from and to the power grid 101 is determined per period of time based on the aggregate result of the first information acquired from the respective electrically driven vehicles 107 by the child aggregator 111. The child aggregator 111 guarantees the parent aggregator 113 an amount of power (hereinafter, referred to as "guaranteed amount of power") capable of being charged and discharged, which varies per period of time, under reliability of a name of a legal entity of the child aggregator 111.

Figure 3:
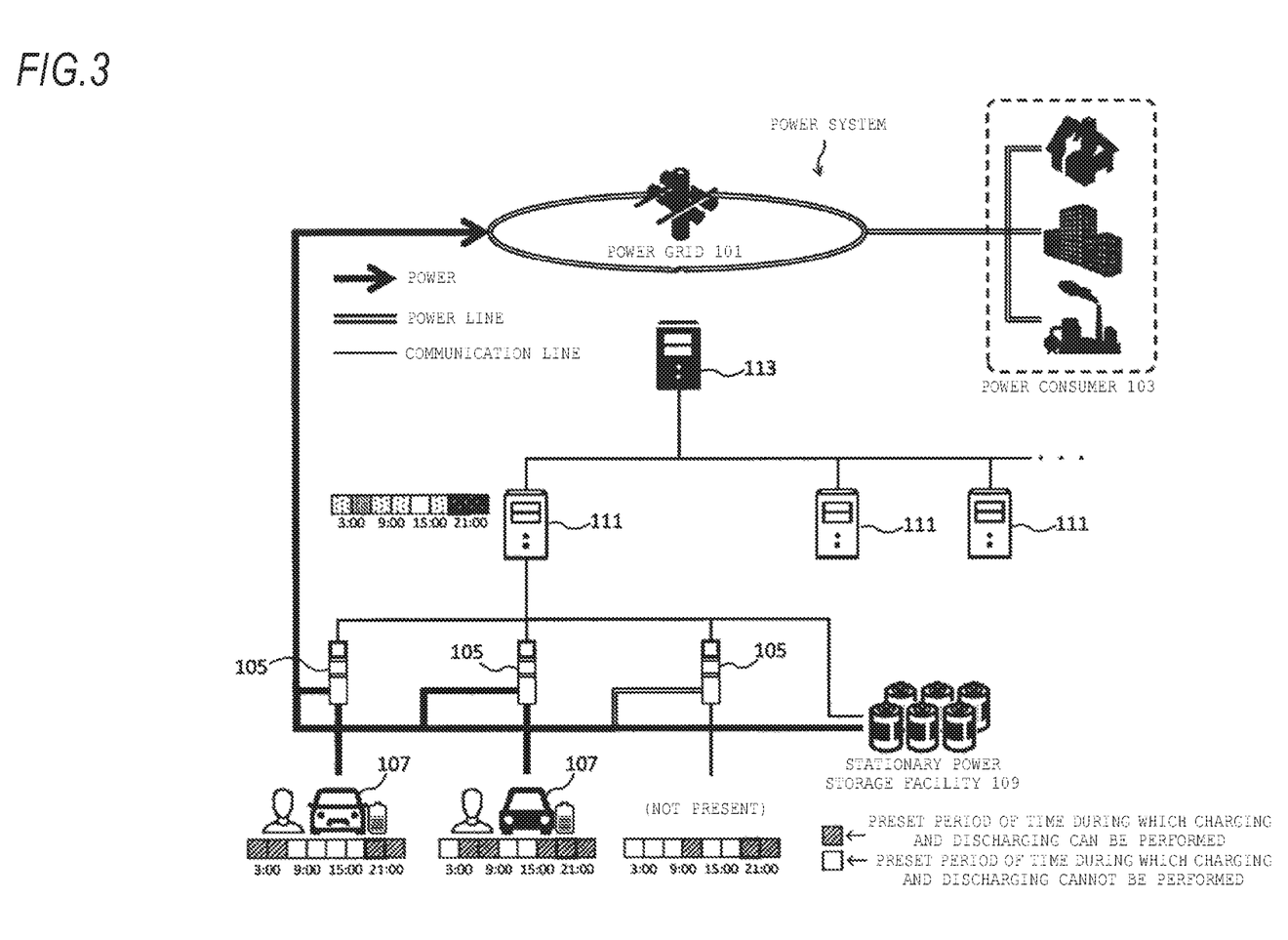
FIG. 3 is a diagram illustrating a state where a stationary power storage facility outputs power when an amount of power capable of being charged and discharged from and to a power grid does not reach a guaranteed amount of power.

However, if the electrically driven vehicles 107 managed by the child aggregator 111 do not operate according to a predetermined schedule, the amount of power capable of being charged and discharged from the electrically driven vehicles 107, which are managed by the child aggregator 111, to the power grid 101 may not reach the guaranteed amount of power. In this case, as illustrated in FIG. 3, the child aggregator 111 causes the stationary power storage facility 109 to output power, which is a difference between the guaranteed amount of power and the amount of power capable of being charged and discharged, to the power grid 101. Accordingly, by using the stationary power storage facility 109 as a buffer during charging and discharging, the child aggregator 111 can guarantee the parent aggregator 113 the guaranteed amount of power.

Figure 4:
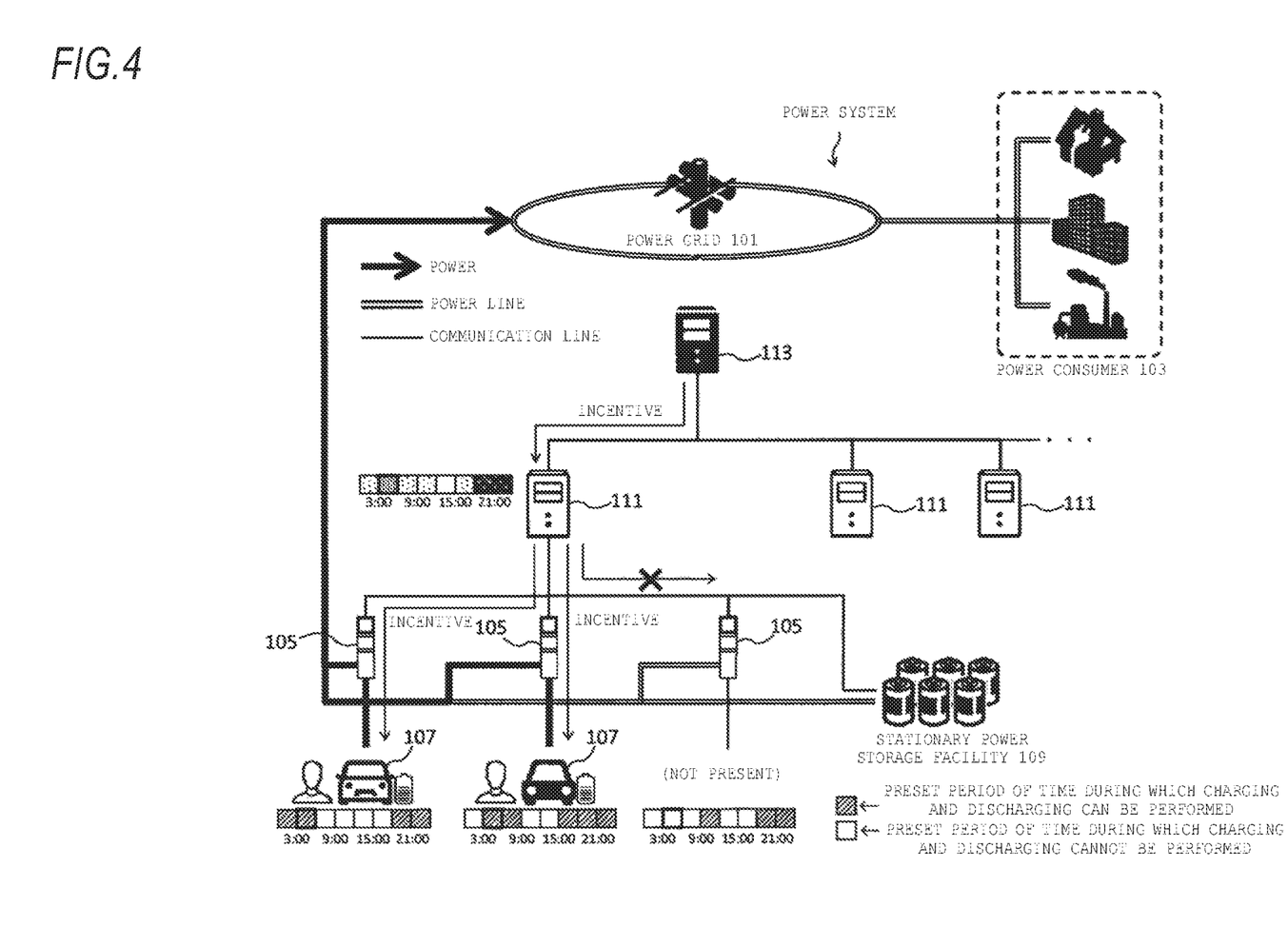
FIG. 4 is a diagram illustrating distribution of an incentive which is obtained by the electrically driven vehicles performing charging and discharging with the power grid.

FIG. 4 is a diagram illustrating distribution of an incentive which is obtained by the electrically driven vehicles 107 performing charging and discharging with the power grid 101. As illustrated in FIG. 4, the child aggregator 111 receives an incentive from the parent aggregator 113 based on a record of the amount of power which is charged and discharged between the electrically driven vehicles 107 managed by the child aggregator 111 and the power grid 101. However, the incentive received by the child aggregator 111 does not correspond to each of the electrically driven vehicles 107. The child aggregator 111 distributes at least a part of the incentive received from the parent aggregator 113 to the electrically driven vehicles 107 performing charging and discharging based on the record and the first information and the second information acquired from each of the electrically driven vehicles 107. The incentive is a benefit for owners of the electrically driven vehicles 107 which performs charging and discharging with the power grid 101. The incentive may be mainly money.

Figure 5:
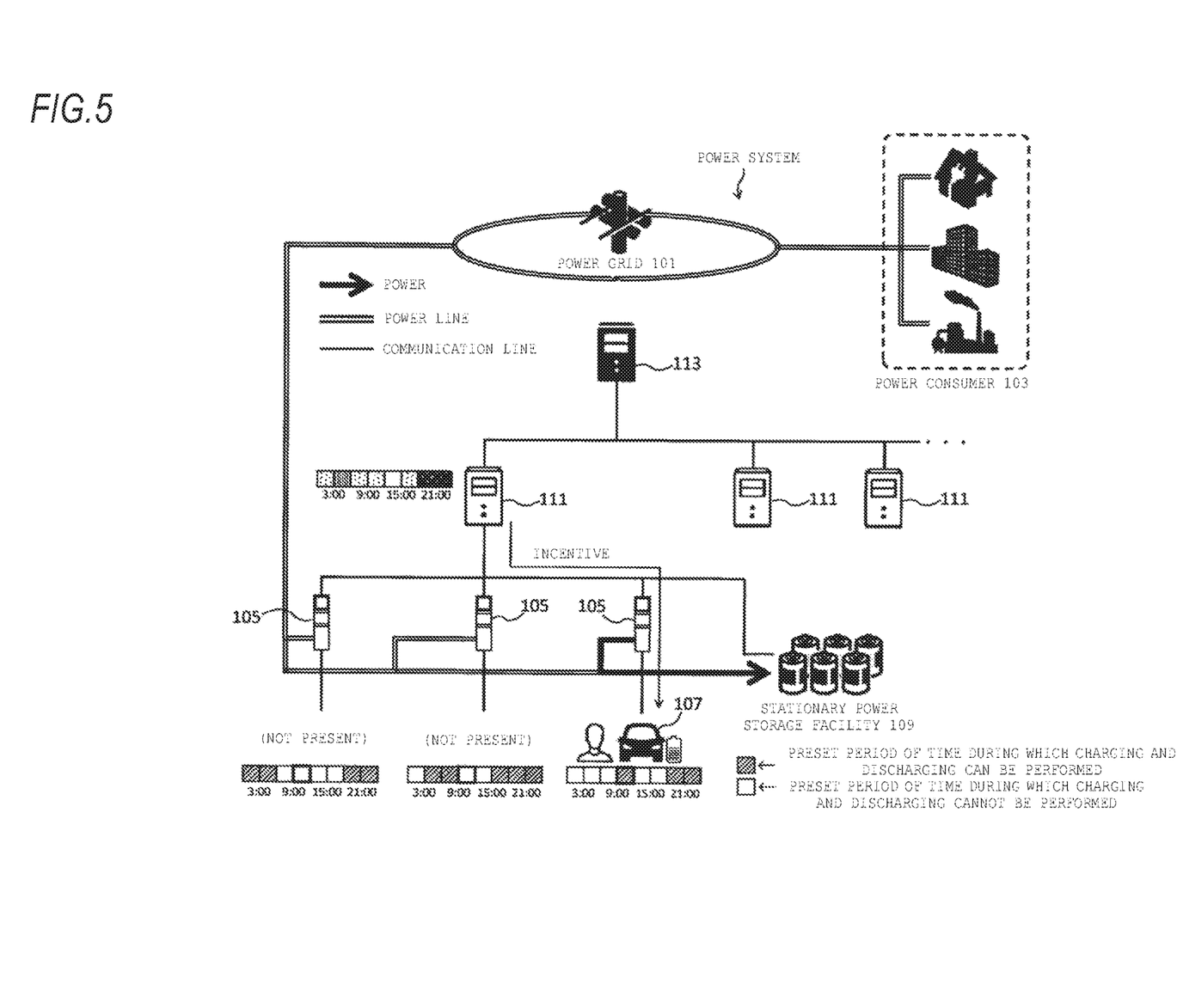
FIG. 5 is a diagram illustrating a state where an incentive is obtained by the electrically driven vehicles discharging power to the stationary power storage facility.

The electrically driven vehicle 107 can obtain the incentive not only for charging and discharging but also other situations. For example, in a case where the power system is stable and there is no charging and discharging instruction from the child aggregator 111, the child aggregator 111 provides the incentive to the electrically driven vehicle 107 which discharges power to the stationary power storage facility 109 as illustrated in FIG. 5.

In addition, based on the record of the amount of power which is charged and discharged between the electrically driven vehicles 107 managed by the child aggregator 111 and the power grid 101, and the first information and the second information acquired from the electrically driven vehicles 107, the child aggregator 111 manages a cumulative time during which each of the electrically driven vehicles 107 performs charging and discharging. If the cumulative time of the electrically driven vehicle 107 exceeds a threshold, the child aggregator 111 prohibits charging and discharging of the electrically driven vehicle 107. The child aggregator 111 prohibits the cumulative time managed by the child aggregator 111 from being modified from the electrically driven vehicle 107.

As described above, when the parent aggregator 113 in the V2G system according to the embodiment manages buying and selling of power to the power grid 101, the child aggregator 111 is considered as one power supply source. In this case, the parent aggregator 113 does not require information regarding the electrically driven vehicles 107 managed by the child aggregator 111. In the embodiment, among the information acquired from the electrically driven vehicles 107 managed by the child aggregator 111, the child aggregator 111 transmits only the first information regarding the schedule to the parent aggregator 113 without transmitting the second information regarding each of the electrically driven vehicles 107 to the parent aggregator 113. Therefore, the second information regarding each of the electrically driven vehicles 107 is not transmitted to the parent aggregator 113. Accordingly, the transmission and holding of the second information, which is desired to be prevented from leaking to the outside, is minimized, that is, the second information is held only in the child aggregator 111. As a result, a system having high information safety can be realized.

In addition, in the power selling market, the power selling price is determined depending on the reliability of a seller in many cases. According to the embodiment, the reliability of the legal entity of the child aggregator 111, which manages the plural electrically driven vehicles 107 and guarantees the guaranteed amount of power, can be used. Therefore, the contract probability of V2G can increase and the power selling price can increase as compared to a case where the owners of the electrically driven vehicles 107 individually make a contract with the parent aggregator 113.

In addition, the stationary power storage facility 109 can be used as a buffer during charging and discharging. Therefore, the reliability of the child aggregator 111 as a legal entity can be improved. As a result, the contract probability of V2G can further increase, and the power selling price can further increase.

In addition, the stationary power storage facility 109 can maintain a power storage state in which it is capable of being charged and discharged by the electrically driven vehicles 107 and can provide the incentive to the electrically driven vehicle 107 which discharges power to the stationary power storage facility 109.

In addition, the child aggregator 111 distributes at least a part of the incentive received from the parent aggregator 113 to the electrically driven vehicles 107 performing charging and discharging based on the record of the amount of power which is charged and discharged. Accordingly, even in a case where the second information regarding each of the electrically driven vehicles 107 is not transmitted to the parent aggregator 113, the child aggregator 111 can provide the incentive to the electrically driven vehicles 107 managed by the child aggregator 111.

In addition, the child aggregator 111 manages the cumulative time during which each of the electrically driven vehicles 107 performs charging and discharging. Therefore, the cumulative time can be managed with high accuracy, and information regarding the cumulative time can be utilized in various situations managed by the child aggregator 111. In addition, the child aggregator 111 prohibits the cumulative time managed by the child aggregator 111 from being modified from the electrically driven vehicle 107. Therefore, the reliability of the cumulative time can be improved.

The present invention is not limited to the above-described embodiments, and modifications, improvements, and the like can be appropriately made.

What is claimed is:

1. A Vehicle-to-Grid (V2G) system, for bidirectional power transfer between batteries provided in a plurality of transport machines and a power system including a commercial power grid, comprising:
   a parent aggregator which is configured to manage buying and selling of power from a plurality of power supply sources to a power grid; and
   at least one child aggregator which is configured to manage charging and discharging between at least one of batteries and the power grid,
   wherein the parent aggregator is configured to manage each child aggregator of the at least one child aggregator as one power supply source and is configured to manage buying and selling of power with the commercial power grid,
   wherein each child aggregator is configured to:
      acquire information, including personal information associated with owners of the plurality of transport machines and also including a time schedule in which the battery provided in a transport machine of the plurality of transport machines can supply power to the commercial power grid, from the transport machine; and transmit an aggregated time schedule, determined based on the acquired information, to the parent aggregator, the aggregated time schedule indicating an amount of power that can be supplied to the commercial power grid by whole batteries managed by the respective child aggregator as an amount of guarantee of power, wherein the acquired personal information associated with the owners of the transport machines is excluded from being transmitted by the child aggregator to the parent aggregator, wherein the at least one child aggregator initiates a control to start a discharge of the supply of power from the at least one of batteries to the commercial power grid, to discharge the supply of power to the commercial power grid in accordance with the aggregated time schedule, wherein the at least one child aggregator initiates a control to start a charge of supply of power from the commercial power grid to the at least one of batteries, to charge the at least one of batteries in accordance with the aggregated time schedule, wherein each child aggregator is further configured to:
  manage a stationary power storage facility connected to the commercial power grid; and
  cause the stationary power storage facility to output power, which is a difference between the amount of guarantee of power and the amount of power supplied from the battery to the commercial power grid, to the commercial power grid when the amount of power supplied from the battery managed by the respective child aggregator to the commercial power grid does not reach the amount of guarantee of power corresponding to the aggregated time schedule, wherein when a power supply-demand state of a power system including the power grid is stable, and when the respective child aggregator causes the battery to discharge power to a stationary power storage facility, the respective child aggregator provides an incentive to the transport machine, in which the battery discharging power to the stationary power storage facility is mounted, according to a record of the discharge, wherein the parent aggregator and the at least one child aggregator are servers, and wherein the parent aggregator and the at least one child aggregator are each implemented via at least one processor.

2. The V2G system according to claim 1, wherein the bidirectional power transfer is performed in a state where the transport machine is connected to an external power supply device managed by the respective child aggregator.

3. The V2G system according to claim 1, wherein the parent aggregator provides an incentive to the respective child aggregator based on a record of the amount of power supplied to the commercial power grid from the batteries managed by the child aggregator.

4. The V2G system according to claim 1, wherein each child aggregator is configured to:
  receive an incentive from the parent aggregator based on a record of an amount of power which is charged and discharged from and to the commercial power grid; and
  distribute at least a part of the incentive received from the parent aggregator to a transport machine of the plurality of transport machines that supplies the power to the commercial power grid based on the record.

* * * * *